(12) United States Patent
Guo et al.

(10) Patent No.: US 7,444,649 B2
(45) Date of Patent: Oct. 28, 2008

(54) TRAY FOR DISC DRIVE

(75) Inventors: Bin-Hai Guo, Shenzhen (CN);
Chien-Ting Lo, Tucheng (TW);
Li-Ming Wan, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 316 days.

(21) Appl. No.: 11/238,852

(22) Filed: Sep. 28, 2005

(65) Prior Publication Data

US 2006/0085802 A1  Apr. 20, 2006

(30) Foreign Application Priority Data

Oct. 20, 2004  (CN)  .................. 2004 1 0051940
Oct. 23, 2004  (CN)  .................. 2004 2 0094437

(51) Int. Cl.
*G11B 17/04* (2006.01)
*G11B 17/056* (2006.01)

(52) U.S. Cl. ..................................... 720/603
(58) Field of Classification Search .......... 720/601–616
See application file for complete search history.

(56) References Cited

U.S. PATENT DOCUMENTS

| 4,564,930 | A |   | 1/1986  | Funabashi et al. |         |
|-----------|---|---|---------|------------------|---------|
| 4,773,056 | A |   | 9/1988  | Ito              |         |
| 5,737,304 | A | * | 4/1998  | Soga et al.      | 720/692 |
| 5,793,729 | A | * | 8/1998  | Soga et al.      | 720/603 |
| 5,930,218 | A |   | 7/1999  | Mitsui et al.    |         |
| 6,052,352 | A | * | 4/2000  | Liou             | 720/603 |
| 6,122,240 | A | * | 9/2000  | Kim              | 720/603 |
| 6,618,340 | B1| * | 9/2003  | Sawada           | 720/603 |
| 6,717,903 | B2|   | 4/2004  | Kitamura         |         |
| 6,826,768 | B2|   | 11/2004 | Wu et al.        |         |
| 6,959,443 | B2| * | 10/2005 | Ohgaki           | 720/603 |
| 2002/0114254 | A1| * | 8/2002 | Ohgaki        | 369/75.2 |
| 2005/0015782 | A1| * | 1/2005 | Wang          | 720/603 |

FOREIGN PATENT DOCUMENTS

| CN | 02204041.2    |   | 1/2003  |
|----|---------------|---|---------|
| JP | 08321111 A    | * | 12/1996 |
| JP | 09251693 A    | * | 9/1997  |
| JP | 11039762 A    | * | 2/1999  |
| JP | 2002245701 A  | * | 8/2002  |
| JP | 2003248998 A  | * | 9/2003  |
| JP | 2004227775 A  | * | 8/2004  |
| JP | 2004234724 A  | * | 8/2004  |

* cited by examiner

*Primary Examiner*—William J Klimowicz
(74) *Attorney, Agent, or Firm*—Morris, Manning & Martin LLP; Tim Tingkang Xia

(57) ABSTRACT

A tray for a disc drive includes a disc receiving region, a side wall substantially surrounding the disc receiving region, and a plurality of hooks extending inwardly from the side wall. The disc receiving region includes a first portion for receiving a disc, and one or more second portions. The hooks is spaced apart from the disc receiving region and spatially corresponding to the one or more second portions of the disc receiving region, and is for preventing the disc from being displaced from the disc receiving region.

3 Claims, 6 Drawing Sheets

TRAY FOR DISC DRIVE

BACKGROUND

1. Field of the Invention

The present invention generally relates to trays for disc drives, and particularly to a tray for a disc drive which can effectively reduce noise and vibration of an optical disc loaded on the tray when the optical disc rotates at high speed.

2. Related Art

Tray-loading type optical disc reading/playing ("reproducing") devices typically include CD-ROM (compact disk-read only memory) drives, DVD-ROM (digital video disc-read only memory) drives and CD audio players. Referring to FIG. 5, this shows a loading tray 1a of a typical tray-loading type optical disc reproducing device, together with an optical disc 30a. In order to prevent the optical disc 30a from being detached from the loading tray 1a when the tray-loading type optical disc reproducing device is operated in a vertical orientation, a plurality of hooks 46a is provided on a peripheral portion 40a of an optical disc receiving region 20a of a main body 10a of the loading tray 1a.

Each hook 46a extends radially inwardly from the peripheral portion 40a of the disc receiving region 20a. In cases where the loading tray 1a is vertically oriented, the optical disc 30a received in the disc receiving region 20a may be retained by the hooks 46a, thereby preventing the optical disc 30a from detaching from the loading tray 1a.

Most trays for disc drives are made of a plastic material, such as ABS (Acrylonitrate-Butadiene-Styrene), PC (Polycarbonate), or a combination of ABS plus PC. Such trays are made by an injection molding process. In the case of the loading tray 1a, an upper mold and a lower mold of an injection mold interface along a path that is generally parallel to an upper surface of the main body 10a. In order to form the hooks 46a and allow easy separation of the upper mold from the lower mold along a single axis, a plurality of mold releasing holes 44a is defined in the disc receiving region 20a below the corresponding hooks 46a. To ensure that the hooks 46a are properly shaped, the mold releasing holes 44a are generally slightly larger than areas of horizontal portions of the hooks 46a. Thus when the injection mold is opened, upper mold is easily moved away from lower mold, and the loading tray 1a can be released from the lower mold by eject rods or an eject plate.

As shown in FIG. 6, when the optical disc 30a is rotated at high speed by a spindle motor, a first airflow 300a flowing over the optical disc 30a and a second airflow 300b flowing under the optical disc 10a are produced. The first airflow 300a may generally flow smoothly over the optical disc 30a. Portions of the second airflow 300b exit through the mold releasing holes 44a. However, the mold releasing holes 44a are generally too small to allow the second airflow 300b to smoothly flow therethrough. That is, the second airflow 300b is retarded and generates turbulence at the mold releasing holes 44a. Thus noise is also generated. The turbulence may also cause the optical disc 10a to vibrate. All in all, the mold releasing holes 44a are prone to generate noise and vibration of the optical disc 10a.

Therefore, a heretofore unaddressed need exists in the industry to address the aforementioned deficiencies and inadequacies.

SUMMARY

Briefly described, one embodiment of a tray for disc drive, among others, can be implemented as described herein. A tray for a disc drive includes a disc receiving region, a side wall substantially surrounding the disc receiving region, and a plurality of hooks extending inwardly from the side wall. The disc receiving region includes a first portion for receiving a disc, and one or more second portions. The hooks is spaced apart from the disc receiving region and spatially corresponding to the one or more second portions of the disc receiving region, and is for preventing the disc from being displaced from the disc receiving region.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF PREFERRED EMBODIMENTS

Figure 1:
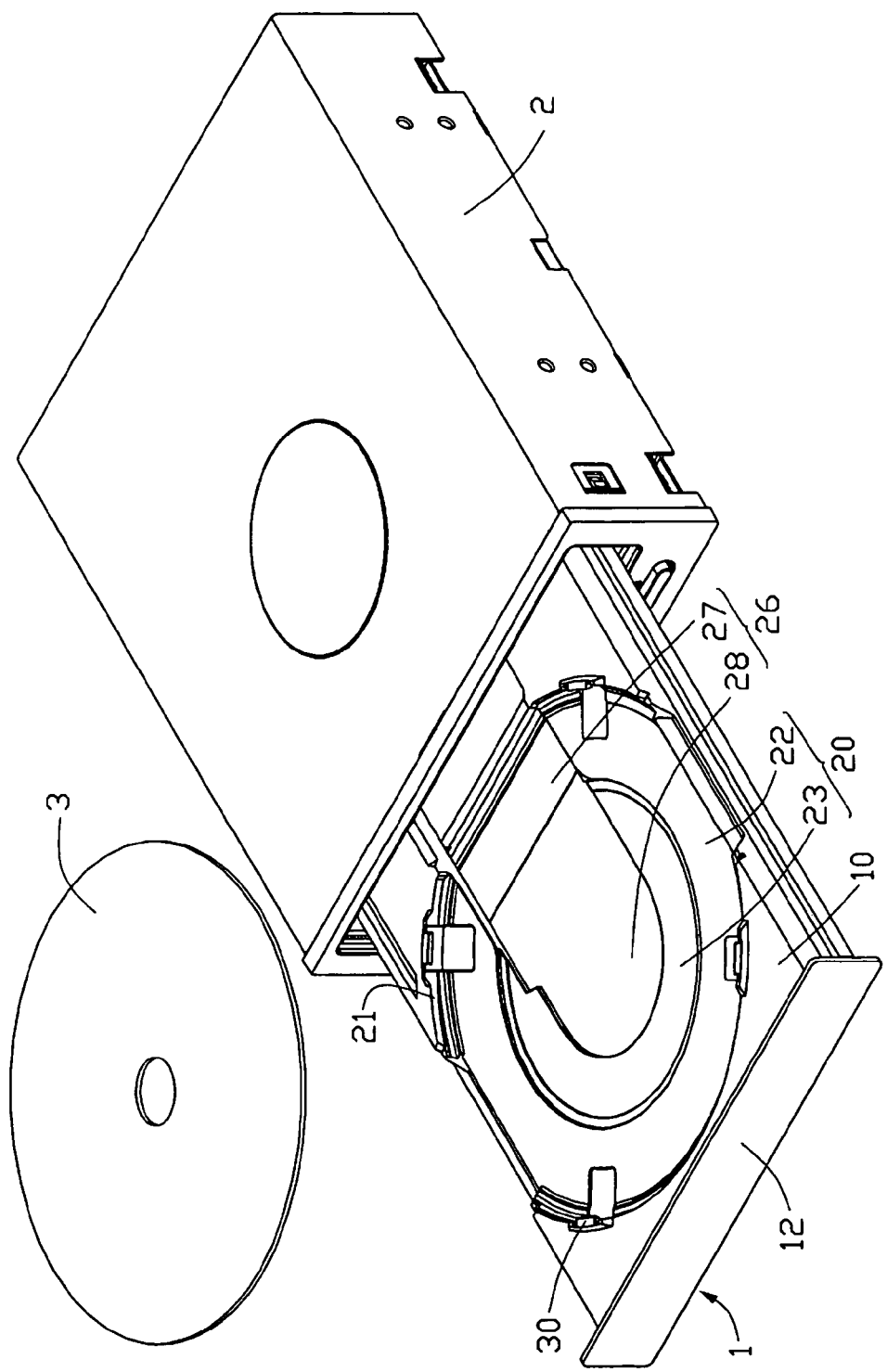
FIG. 1 is an isometric view of a disc drive having a tray in accordance with a first preferred embodiment of the present invention, together with a disc.

Reference will now be made to the drawing figures to describe the preferred embodiments of the present invention in detail.

Referring to FIG. 1, this shows a disc drive having a loading tray in accordance with a first preferred embodiment of the present invention. The disc drive 2 includes the tray 1, for carrying a disc 3 into or out from the disc drive 2. The tray 1 includes a main body 10, a disc loader 20, and a plurality of hook-like retainers 30.

The main body 10 is substantially rectangular, and has a panel 12 fixed to a front thereof.

The disc loader 20 includes a first disc receiving region 22, and a concentric second disc receiving region 23. The first disc receiving region 22 is depressed from an upper surface (not labeled) of the main body 10. A circular side wall 21 surrounds the first disc receiving region 22. The second disc receiving region 23 is concentrically depressed from a bottom (not labeled) of the first disc receiving region 22. The first and second disc receiving regions 22, 23 are respectively for accommodating a 12 cm (centimeter) disc and an 8 cm disc.

A slot 26 is defined in the main body 10, spanning from a center of the disc loader 20 to a back of the tray 1. The slot 26 includes an arch-shaped portion 28 and a rectangular portion 27. The arch-shaped portion 28 is used for allowing a spindle motor (not visible in FIG. 1) of the disc drive 2 to extend therethrough. The rectangular portion 27 is used for allowing a pickup head (not visible in FIG. 1) of the disc drive 2 to move therealong and thereby track tracks of the disc.

The hook-like retainers 30 extend radially inwardly from an upper edge of the side wall 21 of the main body 10. The hooks 30 are evenly arranged along the entire length of the side wall 21. An imaginary circle that passes through inner edges of the hooks 30 has a diameter larger than an outer diameter of the disc 3, so as to allow the disc 3 to be loaded in the disc loader 20 of the tray 1 without interference when the tray 1 is horizontally oriented. When the tray is vertically oriented with the disc 3 being received therein, the disc 3 is supported and retained by the lower hooks 30 due to gravitational force acting on the disc 3. In order words, an edge portion of the disc 3 is brought into contact with the side wall 21. The disc 3 is in effect clamped by the hooks 30, thereby preventing the disc 3 from being displaced from the tray 1. Advantageously, disc drives employing the tray 1 can be operated horizontally or vertically.

Figure 2:
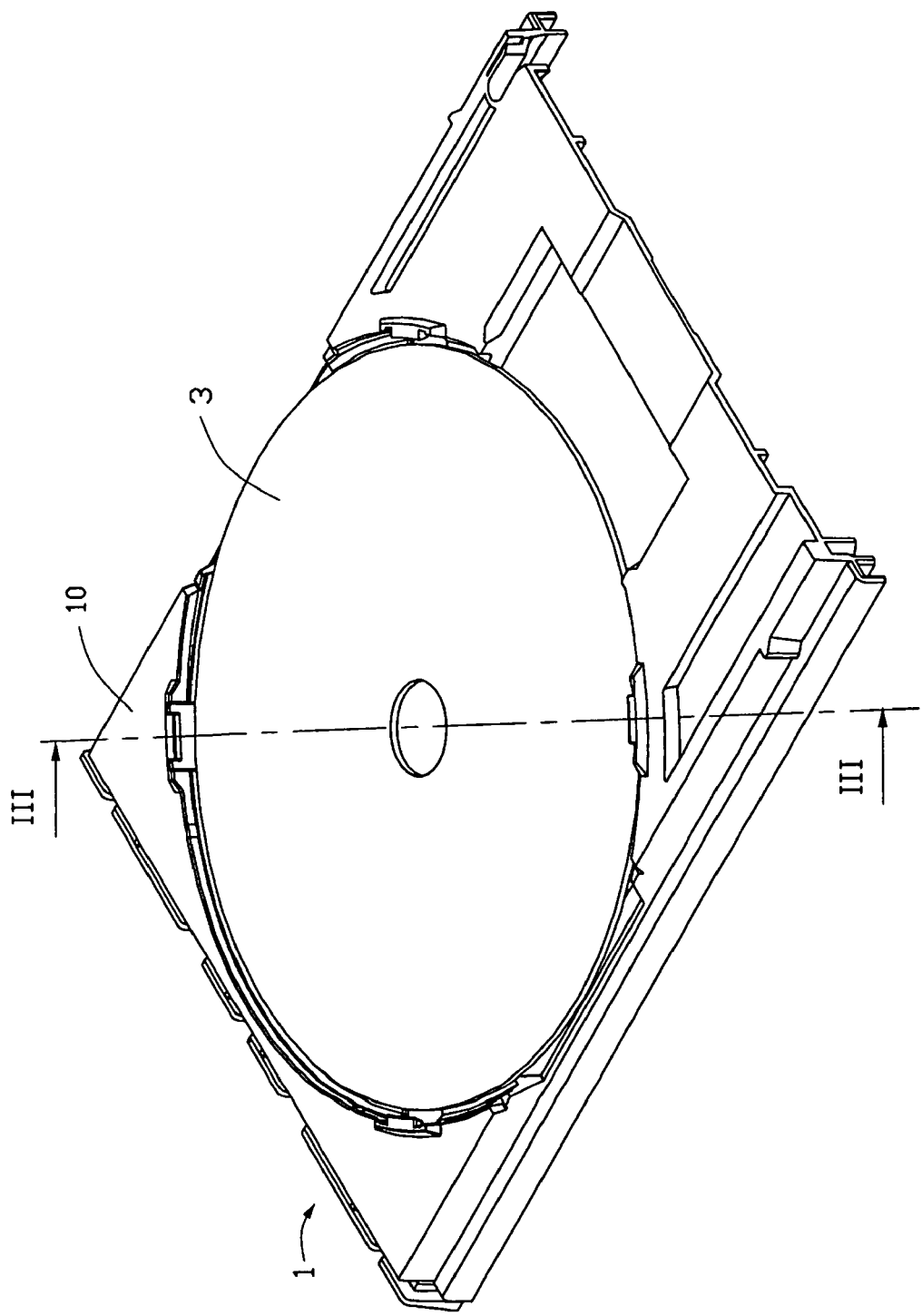
FIG. 2 is an isometric view of the tray of FIG. 1 with the disc loaded thereon, but viewed from another aspect.
Figure 3:
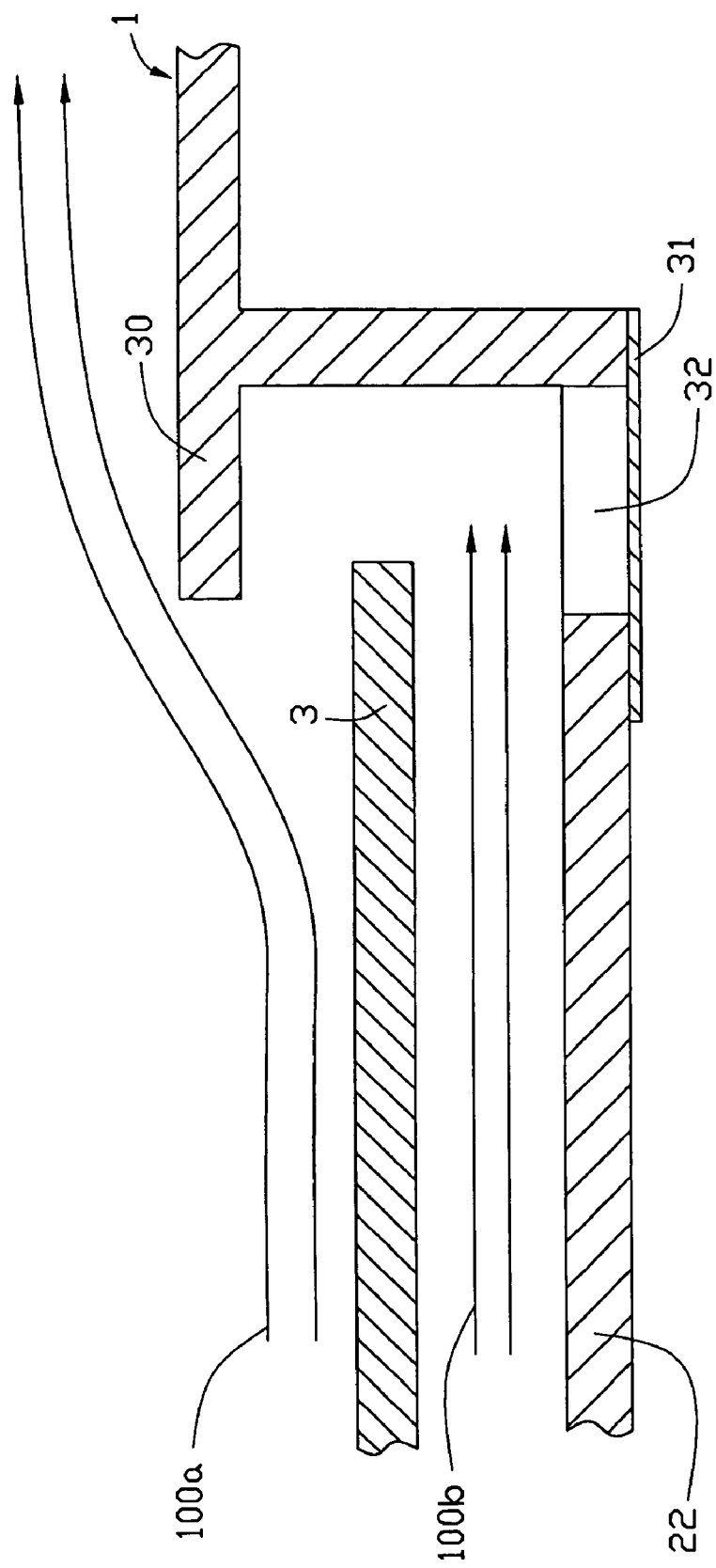
FIG. 3 is a partial cross-sectional view of the tray and the disc, taken along line III-III of FIG. 2, showing different flow directions of a first airflow and a second airflow in operation.

Referring to FIG. 2 and FIG. 3, the tray 1 is made by a conventional molding process. A plurality of molding holes 32 is defined in the first disc receiving region 22 under the corresponding hooks 30. In order to reduce noise that could be caused by the molding holes 32, a plurality of sealing members 31 is attached to the bottom of the first disc receiving region 22, thereby sealing the molding holes 32. When the disc 3 received in the disc drive 2 is rotated by the spindle motor at high speed, a first airflow 100a over the rotating disc 3 and a second airflow 100b under the rotating disc 3 are generated. Because the sealing members 31 block the second airflow 100b from flowing through the molding holes 32, any noise due to the molding holes 32 can be effectively reduced. Similarly, any vibration of the disc 3 can be effectively reduced. In an alternative embodiment, the sealing members 31 may be configured to partially or completely fill the molding holes 32.

Figure 4:
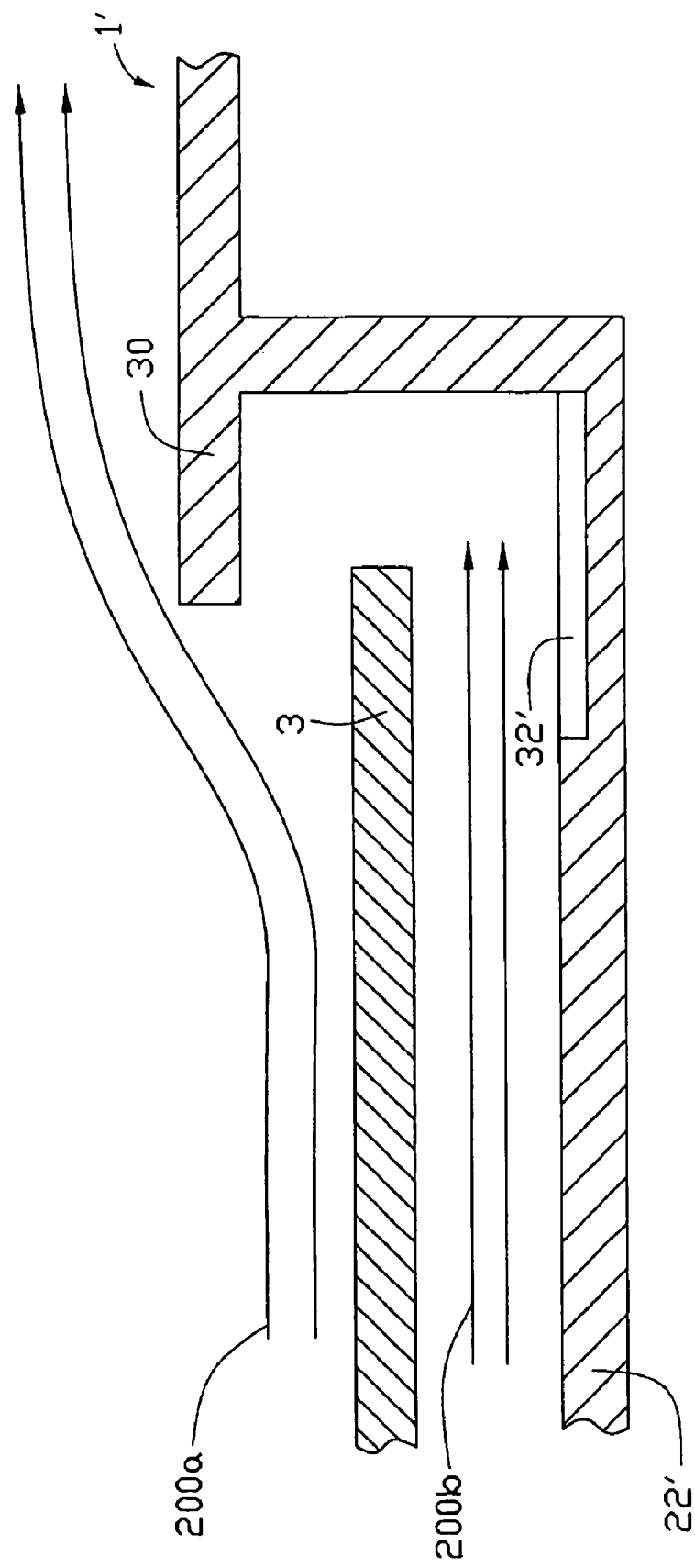
FIG. 4 is FIG. 3, but showing different flow directions of a first airflow and a second airflow in respect of a tray in accordance with a second preferred embodiment of the present invention.
Figure 5:
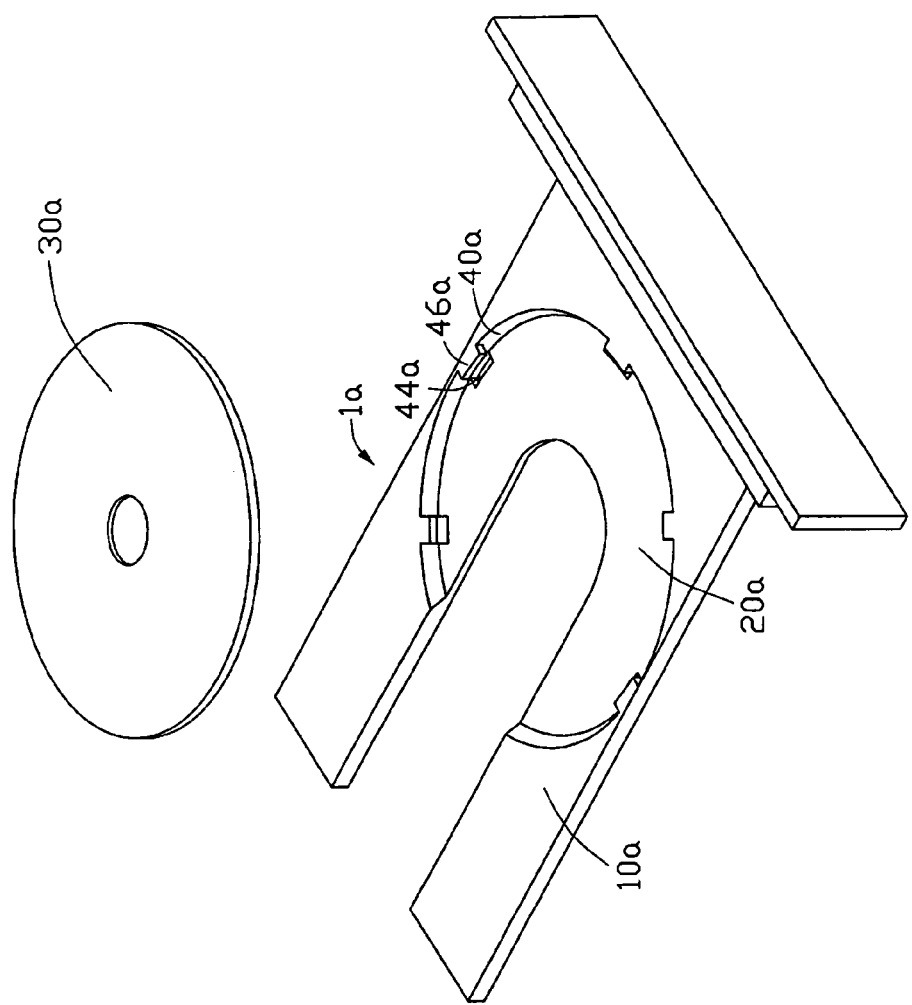
FIG. 5 is an isometric view of a conventional tray of an optical disc reproducing device, together with an optical disc.
Figure 6:
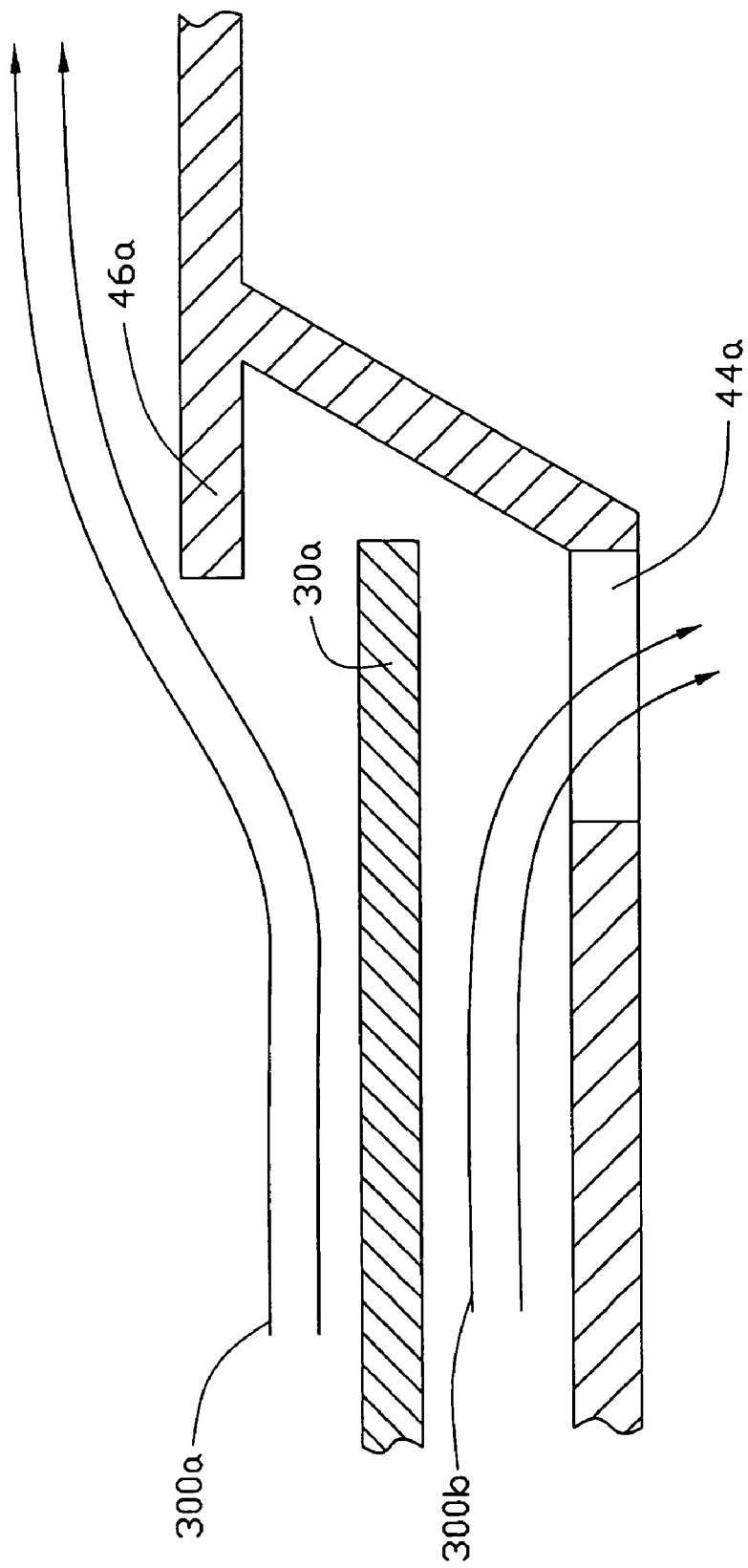
FIG. 6 is a partial cross-sectional view of the tray of FIG. 5 with the optical disc loaded thereon, showing different flow directions of a first airflow and a second airflow in operation.

Referring to FIG. 4, this illustrates a tray 1' in accordance with a second preferred embodiment of the present invention. The tray 1' is made by means of a mold having one or more cores. Thus a plurality of recesses 32' is defined in a first disc receiving region 22'. The recesses 32' facilitate detaching of the loose cores from the tray 1' during the demolding process. With such configuration, no mold releasing holes are defined in the first disc receiving region 22'. When the disc 3 received in the disc drive 2 is rotated by the spindle motor at high speed, a first airflow 200a over the rotating disc 3 and a second airflow 200b under the rotating disc 3 are generated. Due to the absence of mold releasing holes, any noise and vibration of the disc 3 are significantly reduced.

Table 1 shows noise levels of three disc drives that respectively employ the tray 1a (related art), the tray 1 (first embodiment of present invention), and the tray 1' (second embodiment of present invention).

|  | Tray 1a | Tray 1 | Tray 1' |
|---|---|---|---|
| Noise level (dBA) | 51.66 | 49.60 | 34.66 |

As is shown in Table 1, when a disc is rotated at high speed, the noise level in the disc drive employing the tray 1 or the tray 1' is significantly lower than that in the disc drive employing the tray 1a. That is, noise can be efficiently reduced by employing the tray 1 or the tray 1'.

It should be emphasized that the above-described embodiments, including any preferred embodiments, are merely possible examples of implementation of the principles of the invention, and are merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention and be protected by the following claims.

What is claimed is:

1. A disc drive comprising:
   a tray of the disc drive comprising:
   a first disc receiving region for receiving a first disc;
   a second disc receiving region for receiving a second disc having a diameter larger than the first disc;
   a plurality of hooks arranged around the second disc receiving region, for maintaining the second disc loaded in the second disc receiving region;
   a plurality of molding portions spatially corresponding to the plurality of hooks and configured to facilitate formation of the hooks by a molding process and configured to be substantially impermeable to airflow caused by rotation of the loaded second disc, wherein each of the molding portions comprises a recess formed in the second disc receiving region.

2. The disc drive according to claim 1, wherein the recess is formed in the molding process.

3. A disc drive comprising:
   a tray defining a first space and a second space concentric with the first space for respectively accommodating a first disc and a second disc with a diameter larger than said first disc and movable between a first position thereof where said tray stays inside said disc drive and a second position thereof where said tray exposes said first space and said second space to an outside of said disc drive so that said first disc and said second disc are capable of being placed in said first space and said second space respectively and removable therefrom, a region defined in said tray beside said second space and partially surrounding said second space together with a sidewall of said tray defined beside said second space; and
   at least one retainer integrally and protrusively extending from said sidewall into said second space and spaced from said region and said first space, said at least one retainer fixedly staying in said second space to abut against said second disc for retaining said second disc between said region and said at least one retainer when said second disc is loaded in said second space, said at least one retainer projectively defining a portion on said region along a perpendicular direction to said region, and said projective portion of said region spatially communicable exclusively with said second space of said tray and configured to be substantially impermeable to airflow caused by rotation of the loaded second disc, wherein said projective portion of said region is a recess integrally formed together with said region in a molding process of said tray and spatially communicable exclusively with said second space of said tray.

* * * * *